United States Patent Office 3,729,325
Patented Apr. 24, 1973

3,729,325
PROCESS FOR FORMING A STABLE OIL AND WATER-SOLUBLE PROTEIN-CONTAINING EMULSION AND PRODUCT THEREOF
Norman B. Howard, Hamilton, Ohio, assignor to The Procter & Gamble Company, Cincinnati, Ohio
No Drawing. Continuation-in-part of abandoned application Ser. No. 51,007, June 29, 1970. This application July 7, 1971, Ser. No. 160,546
Int. Cl. A23d 3/00
U.S. Cl. 99—123
26 Claims

ABSTRACT OF THE DISCLOSURE

A stable emulsion is formed from liquid fat, particular acidic lipids, water, water-soluble heat-denaturable protein, and, when said acidic lipid is a lipid other than a fatty acid chloride, a polyvalent metal ion salt. The stable emulsion is useful as a food per se or a food additive in preparing food products such as snack foods and synthetic meats. A process for preparing such emulsions is provided.

CROSS-REFERENCE TO RELATED APPLICATION

This application is a continuation-in-part of copending application Ser. No. 51,007 filed June 29, 1970 and now abandoned.

BACKGROUND OF THE INVENTION

Many food products sold in the marketplace require the addition of some fats and protein in order to achieve certain desirable product attributes. Such products may be "wet products," "moist products," or "dry products." Wet products include such items as mayonnaise-type spreads, salad dressings and other soft spread items. Moist products include simulated cheeses, simulated luncheon meats, some spreads containing simulated meats, and synthetic meat products per se such as synthetic bacon, synthetic frankfurters, and other synthetic meats. Dry products include cereals, snack foods, cookies, and anhydrous spreads such as peanut butter.

Most natural food products, whether of the wet, moist, or dry variety, include fats and proteins not as separate items, but rather, the fat and protein are complexed often in the form of an emulsion. Therefore, in simulating natural food products, it is often desirable to add fat and protein in an emulsified state.

However, the formulation of fat- and protein-containing emulsions suitable for use in the food industry is complicated by a multiplicity of requirements for such an emulsion. First, the emulsion must be uniquely stable; that is to say, the emulsion must not separate into oil and aqueous layers upon standing. Secondly, because an important part of food product saleability relates to aesthetic qualities, the emulsion must be uniquely functional for use in food products to provide pleasant texture, appearance, and a distinct lack of off-taste. Finally, because fat and protein, and especially water-soluble protein are fundamentally antagonistic materials in emulsion systems, a suitable emulsion is required to hold these materials into a stable position against powerful physical forces such as gravity and the internal cohesive forces between molecules of the same kind.

Prior art attempts to make a basic food product emulsion containing fat, and water-soluble protein have generally involved the utilization of conventional emulsifiers which form an encapsulating layer around the oil phase of the emulsion. In this regard, see U.S. Pats. 2,913,342 and 2,954,297, as well as 3,108,873. All of these patents show oil/water-soluble protein emulsions wherein the liquid fat is encapsulated in a thin film of a protein-containing water-soluble phase. While the emulsions formulated in the above-identified patents are satisfactory from the standpoint of providing little or no off-taste to food materials to which the emulsion is added, they are somewhat less than desirable from the standpoint of providing the unique emulsion stability necessary for satisfactory functionality in a majority of formulated food products, especially under conditions of heating. In other words, the interfacial film, i.e., the protein-encapsulating film as described in the above-identified patents, is not strong enough to provide for emulsion stability over a variety of environmental conditions such as temperature, pressure, and humidity. It is very important that an oil and water-soluble protein emulsion be extremely stable if it is to be incorporated in a food product, because during processing as well as packaging and shipment the food product may be subjected to a variety of temperature, pressure, and humidity conditions.

It is the object of this invention to provide an oil/water-soluble heat-denaturable protein-containing emulsion which is stable and uniquely functional in food products to which it is added to provide an increased fat and protein content, and which does not impart undesirable off-tastes to the food products to which it is added.

It is a further object of this invention to provide an oil/water-soluble heat-denaturable protein-containing emulsion which is a stable food product per se or which can be dehydrated to form a food product.

SUMMARY OF THE INVENTION

This invention is a uniquely stable oil and water-soluble protein emulsion which is largely insensitive to a wide variety of environmental changes including temperature, pressure and humidity. In other words, the emulsion is very stable and therefore extremely functional in food products because of this stability. The unique stability of the oil/water-soluble protein emulsion of this invention is accomplished by encapsulating the oil phase with a very strong thin film comprising water-soluble heat-denaturable protein, particular acidic lipids and, in some cases, polyvalent metal ion.

More particularly, the invention is a stable emulsion comprising an oil phase and a water phase. The oil phase consists essentially of a liquid fat, particular acidic lipids comprising from 0.1% to 10% by weight of the oil phase and, except when the acidic lipid is a fatty acid chloride, an oil-soluble polyvalent metal ion salt comprising up to 4% by weight of the oil phase. The water phase comprises from 1.0% to 50% by weight of a water-soluble heat-denaturable protein and can contain up to 6% by weight of the water phase of a water-soluble polyvalent metal ion salt. The ratio of oil phase to water phase in the emulsion is generally from 4:1 to 1:10.

It is believed that certain of the emulsions exhibit great stability because the polyvalent metal ions migrate towards the interface of the oil phase and the water phase and form a bridge between the two phases by associating electrostatically or chemically with the particular acidic lipid of the oil phase and the water-soluble protein of the water phase. In any event, the water-soluble protein is thereafter heat-set to form a tough interfacial protein-encapsulating film around the oil phase. The invention also relates to a process of making the above-described uniquely stable oil/heat-denaturable protein emulsion.

DETAILED DESCRIPTION OF THE INVENTION

The product of this invention is a stable emulsion of liquid fat, particular acidic lipids, water, water-soluble heat-denaturable protein, and where the specified acidic lipid is a lipid other than a fatty acid chloride, a polyvalent metal ion salt. The product in its broadest sense can conveniently be described as two phases. One is an oil phase consisting essentially of a liquid fat containing from 0.1% to 10% by weight of the oil phase of certain types of acidic lipids. The other is a water phase comprising water containing from 1% to 50% by weight of the water phase of a heat-denaturable water-soluble protein. If required, the above-mentioned polyvalent metal ion salt can be added to either the oil or water phase, or both. If an oil-soluble polyvalent metal ion salt is employed, it can comprise up to 4% by weight of the oil phase. If a water-soluble polyvalent metal ion salt is employed, it can comprise up to 6% by weight of the water phase. The weight ratio of oil phase to water phase in the stable emulsion is from 4:1 to 1:10.

In regard to the final product, as hereinafter explained in more detail, the oil phase can be thought of as a finely dispersed internal phase maintained within a matrix of encapsulating heat-denaturable protein-containing water phase. It is believed that the oil phase and the water phase are physically or chemically bonded together at an interface by ionic chemical bonds which form between the particular acidic lipid of the oil phase and the polyvalent metal ion if one is employed, and the heat-denatured protein of the water phase. As hereinafter explained, it is the interfacial film formed between the acidic lipid of the oil phase, the polyvalent metal ion, and the heat-denaturable protein of the water phase that provides the unique stable emulsions of this invention.

Further details and description of the product of this invention will be given in connection with the detailed description of the process of this invention.

The first step of the process of this invention comprises forming an oil phase which is a mixture of liquid fat and an acidic lipid, and, in some cases, an oil-soluble polyvalent metal ion salt. As used herein, the term liquid fat includes fats which are normally solid at room temperature but which can be melted to form an oil suitable for use herein. It is essential that the acidic lipid component comprise from 0.1% to 10% by weight of the oil phase. As will be hereinafter explained in more detail in connection with the full description of the completely formed stable emulsion, if less than .1% of acidic lipid is employed, there is an insufficient amount present to be adsorbed at the interface of the oil phase and the water phase to provide a strong encapsulating film of heat-denaturable protein. On the other hand, if amounts of acidic lipid in excess of 10% by weight of the oil phase are employed, rapid precipitation of the acidic lipid results in the preparation of an emulsion which therefore loses its functionality in food products. That is, the emulsion is not stable, and in addition the excess amounts of acidic lipids present can impart off-tastes to the food product to which the emulsion is added. Preferably the acidic lipid comprises from 0.5% to 6.0% by weight of the oil phase.

Liquid fats utilized in forming the oil phase of the stable emulsion of this invention are well known and generally comprise liquid or semi-liquid glyceride shortenings derived from animal, vegetable, or marine fats and oils, including synthetically prepared shortenings. The glycerides can contain saturated or unsaturated "long-chain acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachiodoyl, arachidonyl, behenoyl, ecucoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil and lard; and they can be otherwise formed by various organic syntheses.

The acidic lipids utilized in forming the oil phase of the stable emulsions of this invention are generally particular saturated or trans unsaturated fatty acid or saturated or trans unsaturated fatty alcohol derived substances. The acidic lipids suitable for use in this invention are all characterized by having at least one carboxylic acid or carboxylic acid derived moiety. Acidic lipids of the instant invention consist of the following classes of compounds:

(1) Saturated or trans unsaturated fatty acids containing from 12 to 22 carbon atoms or oil soluble salts thereof. Suitable saturated fatty acids include stearic acid, lauric acid, myristic acid, palmitic acid, arachidic acid, and behenic acid. Suitable trans unsaturated fatty acids include elaidic acids, brassidic acid, petroselaidic acid and vaccenic acid. Suitable salts include stannous stearate and polytitanyl stearate.

(2) The condensation product of either a fatty acid monoglyceride, a fatty acid diglyceride, a mixture of partial fatty acid glycerides, or a monoester of a straight chain aliphatic diol with a saturated or trans unsaturated fatty acid having from 12 to 22 carbon atoms with a polycarboxylic acid which has from 0 to 4 hydroxyl groups, said condensation product having at least one free carboxyl group per molecule (the polycarboxylic acid contains from 3 to 6 carbon atoms, the diols contain from 3 to 5 carbon atoms, the fatty acid radicals in the glyceride are acyl chains containing from 12 to 22 carbon atoms). Examples of compounds of this type include the condensation product of 1-monomyristin, 1-monopalmitin, 1-monostearin, 2-monomyristin, 2-monopalmitin, 2-monostearin, 1,2-dimyristin, 1,2-dipalmitin, 1-stearo-2-palmitin, propylene glycol monostearate, propylene glycol monopalmitate, or propylene glycol monoelaidate with malic acid, tartaric acid, citric acid, citramalic acid, glutaric acid, trihydroxy glutaric acid, mucic acid, saccharic acid and succinic acid.

(3) The condensation product of a saturated or trans unsaturated fatty acid containing from 12 to 22 carbon atoms with a polycarboxylic acid having from 1 to 4 hydroxyl groups, said condensation product having at least one free carboxyl moiety per molecule (the polycarboxylic acid can contain from 3 to 6 carbon atoms). Examples of suitable compounds of this type include the condensation products of any of the fatty acids recited in paragraph (1) above with any of the hydroxyl-polycarboxylic compounds recited in paragraph (2) above.

(4) The condensation product of a saturated or trans unsaturated straight chain fatty alcohol containing from 12 to 22 carbon atoms with a dicarboxylic acid having no hydroxyl groups and containing from 3 to 6 carbon atoms; said condensation product having at least one free carboxyl moiety per molecule. Suitable condensation products of this type include the condensation product of stearyl alcohol, myristyl alcohol, palmityl alcohol, elaidyl alcohol, vaccenyl alcohol or behenyl alcohol with succinic acid, methyl succinic acid, dimethyl succinic acid, glutaric acid or diglycolic acid.

(5) Fatty acid chlorides containing from 12 to 22 carbon atoms. Suitable fatty acid chlorides include stearoyl chloride, palmitoyl chloride, oleoyl chloride, elaidoyl chloride and myristoyl chloride.

(6) Fatty alkyl or trans fatty alkenyl gallates having a chain length of from $C_{12}$ to $C_{22}$. Suitable fatty alkyl or trans fatty alkenyl gallates include stearyl gallate, palmityl gallate, myristyl gallate, elaidyl gallate, vaccenyl gallate and arachidyl gallate.

The acidic lipids hereinbefore described can be prepared as follows:

(1) The saturated and trans unsaturated fatty acids and salts thereof which function as acidic lipids can be readily obtained from glycerides or hydrogenated glycerides by saponification, acidulation, and isolation procedures. The fatty acid desired determines the choice of glyceridic material. For example, hydrogenated soybean oil would yield a concentrate of stearic acid and hydrogenated rapeseed oil would yield a concentrate of behenic acid.

(2) The second group of acidic lipid materials can be prepared by esterifying polycarboxylic acids, polycarboxylic acid anhydrides or polycarboxylic hydroxy acids with mono- and diglycerides, and/or monofatty acid esters of diols by direct esterification. This reaction is advantageously carried out in a mutual solvent such as dimethylformamide, dimethylacetamide, dioxane, xylene, and toluene either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The acidic lipids are isolated by appropriate distillation, and/or washing, and/or crystallization treatments when required to remove solvents, excess reactants, and impurities. It is essential to the functioning of these acidic lipid materials in the emulsions of this invention that the reaction products contain a substantial number of molecules containing one or more unesterified carboxyl groups.

The polycarboxylic acids employed in the above reactions can be used in the form of their anhydrides or acid chlorides, when these are available. The reaction conditions necessary for using the anhydrides or acid chlorides will hereinafter be described more fully in connection with the third group of acidic lipid materials.

(3) The third group of acidic lipid materials can be prepared by acylating the polycarboxylic hydroxy acids with fatty acid chlorides by reaction in appropriate solvents such as pyridine, quinoline, dioxane, dimethylformamide, dimethylacetamide, and mixtures thereof, either with or without addition of lipid solvents such as chloroform, benzene, and ethyl ether. These reactions, and the reactions hereinbefore mentioned in connection with the second group of acidic lipid materials can be carried out over a wide temperature range of from about 0° C. to about 150° C. or higher as long as undesirable side reactions are avoided. Upon completion of the acylation reaction, the acidic lipids are isolated by dilution with an aqueous phase followed by washing, and/or distillation, and/or crystallization when required to remove solvents, excess reactants, and impurities. The method of U.S. Pat. 2,251,695, Tucker, is an effective example of such a procedure.

(4) The fourth group of acidic lipid materials can be prepared by the same procedures used to prepare the second group, using the appropriate fatty alcohols.

(5) The fifth group of acidic lipid materials, i.e., the acid chlorides, can be prepared by conventional acid chloride synthesis such as that shown in Morrison and Boyd, Organic Chemistry (2nd ed.) published by Allyn and Bacon, Inc., at pp. 445, 455–456 and 473.

(6) The sixth group of acidic lipid materials, i.e., the fatty alkyl or trans fatty alkenyl gallates, are derived by reacting gallic acid(trihydroxybenzoic acid) with the desired chain length alcohol by conventional esterification.

Particularly preferred acidic lipids useful in forming the oil phase of the stable emulsions of this invention are saturated and trans unsaturated fatty acids having from 13 to 18 carbon atoms; fatty alkyl and trans fatty alkenyl gallates having a chain length of from 12 to 22 carbon atoms, and most preferably from 14 to 18 carbon atoms; and $C_{13}$ to $C_{17}$ fatty acid chlorides. The above-described preferred acidic lipids are in fact preferred because it has been found by utilizing Du Nouy tensiometer measurements of apparent interfacial tension values between the oil phase and the water phase of the stable emulsions of this invention that the strongest interfacial film of encapsulating heat-coagulable water-soluble protein is formed when the acidic lipid portion of the oil phase is a saturated or trans unsaturated fatty acid, a fatty alkyl or trans fatty alkenyl gallate or a fatty acid chloride. The Du Nouy tensiometer measurement of apparent interfacial tension will be described in further detail hereinafter.

It is important to note that all of the acidic lipid substances, except the fatty acid chlorides useful in the oil phase of the stable emulsions formed herein, have been characterized as saturated or trans unsaturated. The utilization of saturated or trans unsaturated acidic lipid substances, with the one exception of fatty acid chlorides where either saturated or cis and trans unsaturated compounds function satisfactorily, is critical in that it has been found that utilization of cis unsaturated acidic lipids will provide an emulsion and an interfacial film which is weak, and consequently the emulsion is relatively unstable. It should be noted that as used herein the term "unsaturated" (cis or trans) is not meant to include aromatic double bonds such as in gallic acid, for example.

No particular criticality exists with regard to the method of combining the acidic lipid material with the liquid fat in forming the oil phase. The acidic lipid material may be added to the liquid fat or the liquid fat may be added to the acidic lipid material. Because both materials are lipophilic in character, they are readily soluble in each other, and accordingly, after addition little mixing need be accomplished. However, it is desirable to employ some mixing and moderate heating to insure complete solution.

If the acidic lipid of the oil phase is not a fatty acid chloride, a source of polyvalent metal ions must be added to the emulsion of the present invention. This addition can be accomplished by including in the oil phase an oil soluble polyvalent metal ion salt or by including a water-soluble polyvalent metal ion salt in the water phase. Such a salt can comprise up to 4% by weight of the oil phase in the case of the oil-soluble salt and up to 6% by weight of the water phase in the case of the water-soluble salt. Whether the salt is incorporated into the emulsion via the oil phase, water phase, or both, the amount must be sufficient to provide a polyvalent metal ion salt concentration within the range of from about 0.002% to 5.4% by weight of the emulsion. Below this range the amount of polyvalent metal ion is insufficient for stabilization at the interface of the oil and water phase. Above this concentration undesirable precipitation can occur, and undesirable flavor characteristics may develop. A preferred oil-soluble polyvalent metal ion salt range is from 0.25% to 2% of the oil phase when such salt is the sole source of polyvalent metal ion. Any polyvalent metal ion salt which has a long chain oil soluble anionic group may be employed. It should be noted that the same compound can serve both as the requisite acidic lipid and the source of polyvalent metal ions. Examples of operable oil-soluble salts include the preferred stannous stearate and polytitanyl stearate.

It should also be noted that the oil phase should be kept free of any substance which interferes with the formation of the strong interfacial film of the instant emulsion. Examples of such interfering lipophilic materials include the particular cis unsaturated acidic lipids as discussed above. Other examples include such standard cake emulsifiers and additives as propylene glycol monostearate, monoacetyl monostearin, lactostearins and other compounds which have a tendency to form α-crystalline phases. If such compounds are present in the oil phase of the instant invention, stability of the present emulsion is greatly impaired upon heating.

The second step of the process of forming the stable emulsions of this invention comprises the formation of the water phase. In its broadest terms the water phase comprises water and water-soluble heat-denaturable protein. Where the acidic lipid of the oil phase is a lipid other than a fatty acid chloride, the requisite polyvalent metal ions can be provided, in whole or in part, by a water-soluble polyvalent metal ion salt dissolved in the water phase as previously discussed.

Turning now to the protein portion of the water phase, it is important to note that the protein which comprises from 1.0% to 50% by weight of the water phase must be a water-soluble, heat-denaturable protein. For purposes of the present invention, protein is "water-soluble" if it can be dissolved in water with or without the aid of heat, chemical or enzymatic treatment. While the water phase must contain dissolved protein to the extent of the above-specified weight concentration range, the water phase can additionally contain insoluble dispersed protein.

The solubility of the different kinds of proteins vary widely. The solubility of a protein depends upon the molecular proportion of the nonpolar or hydrophobic groups and polar or hydrophilic groups at any given pH. Proteins of low solubility can be increased in solubility in a variety of ways. These can include acid or base hydrolysis and degradation of high molecular weight proteins down to a lower molecular weight range by treatment with a proteolytic enzyme. If an insoluble protein is composed of aggregates of low molecular weight subunits, dissociation of the aggregates to increase solubility can be achieved by treatment with certain chemical reagents such as urea, guanidine salts, reducing agents, and anhydrides (e.g., maleic or succinic anhydrides). Protein dissociation with maleic anhydride is discussed by C. L. Sia and B. L. Horecker in "Dissociation of Protein Subunits by Maleylation," Biochim. Biophys. Res. Comm., 31, #5 (June 1968) at pp. 731–737 incorporated herein by reference. The addition of mono- and polyvalent ions such as sodium chloride or glycine also can increase the solubility of proteins. Since proteins are multivalent amphoteric substances, containing positively and negatively charged groups, the number of which vary as the pH varies, the solubility of proteins, in the absence of salt, is generally least at its isoelectric point or that pH where the net charge of the protein is zero.

No criticality exists with regard to the source of the water-soluble heat-denaturable protein. The source may be either animal protein or vegetable protein. Of course the protein must be an edible protein material because it is to be incorporated in foods. Examples of suitable vegetable protein sources are soybeans, safflower, corn, peanuts, wheat, peas, and other well known cereal grains. Generally, if the protein source is a vegetable protein, the protein prior to use is placed in a relatively pure form. Thus, for example, if the protein source is soybeans, the soybeans may be dehulled and solvent extracted preferably with hexane to remove the oil therefrom. The resulting oil-free soybean meal is then suspended in water and alkali is added to dissolve the protein and leave behind undissolved carbohydrate. Thereafter the protein is precipitated from the alkaline solution by the addition of an acidic substance. Precipitated protein is then washed, neutralized, and dried to prepare a substantially pure protein isolate. Similar methods can be utilized with regard to other cereal sources of protein.

If desired, edible protein sources can also include animal proteins such as cheap cuts of meats, milk, poultry, fish, meat scraps, or single cell proteins such as yeast. A typical example of a suitable animal protein is egg albumen.

The edible protein, as previously mentioned, must be a water-soluble heat-denaturable protein. It is essential that the protein be a heat-denaturable protein in order to insure during the subsequently described heating step that the protein can be heat-denatured or heat set to form a protein-lipid complex encapsulating the inner oil phase. If the protein is not a heat-denaturable protein, the interfacial film between the oil phase and the water phase will not be a strong film, and accordingly, the stability of the emulsion will not be very great.

The exact quantity of water-soluble heat-denaturable protein utilized in forming of the water phase must be within the range of from 1.0% by weight of the water phase to 50% by weigh of the water phase, and preferably, from 2.5% to 40% by weight of the water phase. It is essential that a minimum amount of 1% protein be utilized in order to form a strong interfacial film having a high apparent interfacial tension (interfacial tension measurements will be hereinafter explained). On the other hand, it is generally impossible to dissolve protein in excess of 50% by weight of the water phase. Generally, the exact amount of protein utilized within the broad range of 1% to 50% by weight for any particular food product depends upon the material to which the basic food emulsion of this invention is to be added. However, from the standpoint of emulsion stability the preferred range of from 2.5% to 40% by weight, gives the best results.

As has been discussed, where the acidic lipid substance of the oil phase is a lipid other than a fatty acid chloride, the emulsion must contain from about 0.002% to 5.4% by weight of a polyvalent metal ion salt. Non-toxic metals (at relatively low concentrations) which can be used to form polyvalent metal ion salts for use in this invention in combination with the above-mentioned water-soluble heat-denaturable proteins include magnesium, calcium, strontium, barium, aluminum, titanium, tin, manganese, iron, cobalt and nickel. The non-toxic, water-soluble salts of these metals include compounds such, for example, a calcium chloride, magnesium chloride, magnesium bromide, magnesium iodide, magnesium iodate, stannous chloride, aluminum sulfate, strontium tartrate, barium gluconate, manganese succinate, nickel nitrate, cobalt chloride, sodium aluminum sulfate, and ferric manganese citrate. As noted above, operable oil-soluble salts include stannous stearate and polytitanyl stearate. It will be understood that the invention is not limited to the foregoing specific polyvalent metal ion salts which are merely illustrative of the salts which can be used in the invention.

The preferred metal from which the polyvalent metal ion salts utilized in the process of this invention are derived is calcium because of its peculiarly unique compatibility with the water-soluble heat-denaturable protein material of the water phase. The preferred water-soluble polyvalent metal ion salt is calcium chloride. The most preferred oil-soluble polyvalent metal ion salt is stannous stearate.

Where a water-soluble salt is employed as the sole source of polyvalent metal ions, it is important that the amount be from .01% to 6% by weight of the water phase. If amounts less than .01% are utilized, the amount of polyvalent metal ion present is insufficient to provide the necessary amount required for stabilization at the interface of the oil and water phase, as will be hereinafter explained in more detail. On the other hand, if amounts in excess of 6% by weight of the water phase are employed, the amount of polyvalent metal ion present is so great that precipitation of the mixture of the polyvalent metal ion and the protein begins to occur, which of course decreases the stability and functionality of the subsequently formed emulsion. Also, amounts in excess of 6% by weight often impart bad eating properties to the food material to which the stable emulsion of this invention is to be added. Preferred amounts of water-soluble polyvalent metal ion salt, where one is employed, are from .1% to 2% by weight of the weight of the water phase. The polyvalent metal ion salt can, of course, be added to the water phase indirectly such as by utilization of water of sufficient hardness to provide the minimum concentration of polyvalent metal ion, e.g., calcium and/or magnesium.

While not critical, it is preferred that the water phase have a pH within the range of 6.5 to 11.0 and preferably from 7.5 to 9.5. pH's within these ranges have been found desirable because most proteins seem to be soluble at such pH's. It is also believed that pH's within the above described ranges help place the protein in a proper unfolded stereochemical configuration for use in the emulsions of this invention.

The third step of the process of this invention involves mixing at a weight ratio of oil phase to water phase of from 4:1 to 1:10, the above-described oil phase and the above-described water phase to provide an emulsion. No special criticality exists with regard to the mixing or emulsification technique of this third step, and generally, any conventionally used means of forming an oil-in-water emulsion can be employed. For example, agitating vessels, high shear mixers, colloid mills, aerators, soil dispersing mixers, Omnimixers, and other well-known mixers such as, for example, Waring Blendors can be employed. The period of time during which mixing is continued is not critical. Mixing is simply continued until a visual examination of the mixture reveals that an emulsion has been formed. Generally this will occur within from 1 to 15 minutes, depending upon the size of the batch of the mixture of oil phase and water phase. Once a visual examination of a microscopic examination gives the apparent impression that an oil-in-water emulsion has been formed, no particular advantage is gained by further mixing as the degree of emulsification is not thereafter increased.

It is important to note that the weight ratio of oil phase to water phase must be within the range of from 4:1 to 1:10. If the ratio of oil phase to water phase is in excess of 4:1, the amount of oil present is too great to form a satisfactory emulsion with the amount of water phase that is present. Moreover, during the formation of an emulsion where the amount of oil phase to water phase exceeds the ratio of 4:1, the oil phase has an increased propensity to become the external phase of the emulsion whereas in the stable emulsions of this invention the oil phase must be the internal phase surrounded by a matrix of heat-denatured protein in order to be stable. The upper limit of oil phase to water phase ratio of 1:10 is a practical upper limit; in other words, no criticality exists with regard to the total amount of water phase present, primarily because excess water can easily be removed by drying during heat setting if desired. A highly preferred ratio of oil phase to water phase is within the range of from 3:1 to 1:3. Ratios on a weight basis within this range have been found to provide emulsions of maximum stability with little or no excess amounts of either oil phase or water phase being found present.

The fourth step of the process of this invention involves heating of the emulsion formed during the third step in order to heat-set the emulsion into a unique and highly stable condition. During this step the emulsion is heated at a temperature in excess of 40° C. for a sufficient period of time to heat-set the heat-denaturable protein of the water phase. A preferred minimum heat-setting temperature is 60° C. It is essential that the minimum heat-setting temperature be in excess of 40° C. because temperatures less than 40° C. are generally insufficient to provide heat-setting of the water-soluble, heat-denaturable proteins utilized in the process of this invention. Of course, if the final product is to have large contents of moisture, heat-setting should be at temperatures less than the water phase boiling point; on the other hand, if the product is to be dry substantially higher temperatures can be employed to simultaneously heat-set and dry the emulsion.

In regard to the time of heating the emulsion formed in the third step, no criticality exists. The exact time of heating during the fourth step of the process of this invention depends upon the size of emulsion sample employed, the heat transfer efficiency through the sample, and the composition of the sample. Generally, however, satisfactory heat setting would be found to occur during the time of from 2 minutes to 90 minutes, and preferably from 5 minutes to 45 minutes.

In regard to the method of heating employed during the fourth step, again no criticality exisits and any heating method which provides temperatures within the above-described range may be employed. Typical examples are microwave heating, water bath heating, oil bath heating, hot air heating, and heating in an autoclave.

After heating in the manner described above, the emulsion of the oil phase and water phase is now stable, and if desired any excessive amounts of water may be removed by conventional water removal techniques such as evaporation.

Often it is desirable to have as a part of the basic food emulsion, carbohydrate as well as fat and protein, and therefore where it is desirable to increase the amount of carbohydrate present, an additional step of the process may comprise adding from 1% to 35% by weight of the total emulsion, a carbohydrate material such as starch derived from any conventional cereal grain. The exact amount of carbohydrate employed will generally vary from 1% to 35%, depending upon the type of food material to which the emulsion is to be added; however, in regard to functionality, it is preferable to add carbohydrate at a level within the range of from 5% to 20% by weight of the emulsion.

Turning now to a description of the emulsion per se which is formed during the process of this invention, the emulsion can generally be thought of as an internal oil phase, an interfacial phase, and if complete drying is not employed, an external water phase.

Electronmicrographs, radioactive isotope tagging techniques and chemical analysis indicate that the physical structure of the interfacial membrane formed at alkaline pH's is a dispersion of hydrated and denatured protein with occluded soap crystals in an oil phase.

Except when the acidic lipid is a fatty acid chloride, the emulsion must contain polyvalent metal ions. Although the instant invention is not limited to any particular theory, it is believed that these positively charged polyvalent metal ions migrate towards the carboxylic acid moiety of the acidic lipid portion and form a partial bond with the carboxylic acid moiety. Because the metal ion is a polyvalent metal ion, there is at the interface of the oil phase and the water phase, an excess of charges and, because water-soluble heat-coagulable proteins are generally negatively charged under the conditions used herein, the protein probably migrates towards the interface and forms a bond with the remaining positive charges from the metal ions. In other words, the polyvalent metal ions where they are employed can be thought of as bridging a bond between the acidic lipid portion of the oil phase and the anionically charged protein portion. After heating, the water-soluble protein portion contained in the interfacial phase is coagulated or set in its relative position of surrounding the external portion of the oil phase and bonded thereto through the polyvalent metal ions, and consequently remains relatively stable in that position. Subsequently, if desired, excess water may be removed from the external water phase leaving behind largely the interfacial film or matrix surrounding the internal oil phase. The interfacial film is uniquely strong and because it totally encapsulates the internal oil phase, allows the emulsion to be extremely stable.

In regard to emulsion stability, it is felt that this property is related to the oil-aqueous phase interfacial tension since it is believed that the encapsulating film which is formed around the internal oil phase and the strength of that film tends to increase the stability of the emulsion. Therefore a measure of the apparent strength or the apparent interfacial tension of the external phase is in fact a measure of the strength of that phase and of the emulsion's stability. Apparent interfacial tension can be thought of very simply as the amount of force required to break thorugh the interfacial encapsulating film surrounding the oil phase. Such a measurement is given in dynes/centimeter and can be measured with a Du Nouy tensiometer.

Very briefly, the method of testing apparent interfacial tension comprises suspending a small O-shaped ring within a water phase and then gradually pulling that ring up to and then through the surrounding interfacial phase and measuring the required amount of force in dynes/centimeter utilized to cause a rupture of the encapsulating protein-containing film which forms the interfacial phase. Of course, the more force required the stronger the interfacial film and the greater the emulsion stability. The test is conducted on a composition identical to the actual mixed emulsion; however, with respect to the test portion the mixing procedure is not employed in order to induce formation of a large film of identical composition to the interfacial film of the emulsion. The test is then conducted on the larger film. This procedure is employed because conducting the test on the tiny droplets of the emulsion is impossible because of the small size of the interfacial film encapsulating the oil phase.

It is to be noted that in connection with the previous description of the product and the process of this invention, it has been stated that polyvalent metal ions are essential to the emulsions of this invention except when the acidic lipid portion of the oil phase is a fatty acid chloride. When the acidic lipid portion is a fatty acid chloride, there is no need for a bridging polyvalent metal ion to be present since it is believed that the acid chloride reacts with the amine moiety of the protein to provide the interfacial bonding necessary to encapsulate the internal oil phase within a matrix of water-soluble protein phase to provide a film having excellent strength and a stable emulsion.

The apparent interfacial tension of the emulsions of this invention as measured by a Du Nouy tensiometer should generally be within the range of from 20 dynes/centimeter to 100 dynes/centimeter, and most preferably are within the range of from 30 dynes/centimeter to 60 dynes/centimeter.

The essential nature of employing each of applicant's ingredients with respect to the oil phase and the water phase in forming the strong and stable emulsions of this invention can be seen from the following comparative tests which were performed.

In the comparative tests shown in the table below, combinations of each of the ingredients of the invention leaving out one or more of the claimed combination, are shown. Run No. 8, marked with an asterisk, is the only run shown in the table which utilizes each of the essential elements of the claimed combination. In every instance the oil phase and water phase were combined at weight ratio of 1:1. The acidic lipid when employed comprised 2% by weight of the oil phase, the polyvalent metal ion salt where employed comprised .1% by weight of the water phase, and the water-soluble heat-denaturable protein comprised 5% by weight of the water phase. As can be seen from the table, only Run No. 8, which utilized the total combination of ingredients of the stable emulsion claimed in this invention, exhibited an apparent interfacial tension of greater than 19 dynes/centimeter. More specifically, the run labeled 8 which falls within the scope of this invention was shown to have an apparent interfacial tension more than twice as great as the interfacial tension of any of the other runs. Levels of apparent interfacial tension of at least 20 dynes/centimeter are generally accepted as required in order to provide stable oil and water emulsions.

TABLE

| | Liquid fat (cotton-seed oil) | Acidic lipid (stearic acid) | Metal ion (CaCl₂) | Water | Water-soluble protein (egg white) | Apparent interfacial tension (dynes/cm.) |
|---|---|---|---|---|---|---|
| 1 | X | | | X | | 19 |
| 2 | X | | | X | X | 8 |
| 3 | X | | X | X | | 15 |
| 4 | X | | X | X | X | 8 |
| 5 | X | X | | X | | 19 |
| 6 | X | X | | X | X | 3 |
| 7 | X | X | X | X | | 17 |
| 8* | X | X | X | X | X | 39 |

In making each of the above identified runs, the technique previously described with reference to the process description was utilized to the extent possible depending upon which ingredient or ingredients were left out of the composition. With regard to the run labeled 8 and marked with an asterisk, the following conditions were employed. The oil phase was formed by adding 2% by weight of the oil phase (1 gram) of stearic acid to 49 grams of cottonseed oil. The mixture was heated to 160° F. and stirred for 10 minutes. Thereafter a water phase was formed comprising 47.45 grams of water and .1% by weight of the water phase of calcium chloride (.05 gram) and 5% by weight of the water phase of egg albumen (2.5 grams) which is a water-soluble heat-denaturable protein. The mixture was stirred at room temperature of 30 minutes. Thereafter the oil phase and the water phase were added together at a weight ratio of oil phase to water phase of 1:1. Thereafter mixing occurred for 2 minutes at 16,000 r.p.m. in an Omnimixer. The mixture was then heated at 90° C. for 15 minutes to provide heat-setting by coagulating the egg albumen protein. Du Nouy tensiometer apparent interfacial tension measurements, as previously described, were conducted at 50° C. on identical composition samples which had not been mixed in an Omnimixer.

In the previous description and in the following Examples as well as the claims, it is to be understood that since the emulsions which form a part of this invention are to be added to foods, each of the described ingredients of those emulsions must be edible and non-toxic in character.

In further regard to the ultimate food compositions containing the emulsions of this invention, depending upon the food which is being prepared, certain specific amounts of preservatives, flavoring, coloring, and other minors can be used. The use of these conventional minors is shown in the examples where specific food products were made.

The following examples are given to further illustrate the process and product of this invention.

EXAMPLE I

In this example, the oil phase comprised partially hydrogenated safflower oil having an SCI value of 28 at 70° F. as the liquid fat and stearic acid as the acidic lipid. The total weight of the oil phase was 50 grams and 2% by weight of the oil phase was stearic acid, and the remainder was safflower oil. The stearic acid which is an acidic lipid was added to the safflower oil, and the mixture was mixed with slow stirring for 10 minutes and heated to 160° F. to provide a solution of the acidic lipid dissolved in the oil.

Thereafter a water phase was formed comprising water, soybean protein as a water-soluble heat-denaturable protein, and calcium chloride as a source of polyvalent metal ion. The total weight of the water phase was about 50 grams and the water phase comprised 40 grams of water, .05 gram of polyvalent metal salt (.1% by weight of the water phase) and 10 grams (20% by weight of the water phase) of soybean protein as the heat-denaturable water-soluble protein.

Thereafter the oil phase and the water phase at a weight ratio of 1:1 were combined and mixed for 2 minutes in an Omnimixer to provide an emulsion of the oil phase in the water phase. The emulsion was then heated at 90° C. for 5 minutes to provide heat coagulation of the protein. Subsequently by utilization of a Du Nouy tensiometer and the testing method previously described, the apparent interfacial tension of the above-described emulsion composition was determined and found to be 29 dynes/centimeter.

The product of this example was noted to have the consistency and spreadability properties of a mayonnaise or salad dressing. Compounds of substantially similar stability are obtained when the stearic acid of the oil phase is replaced by elaidic acid, a trans unsaturated $C_{18}$ fatty acid. Similar composition stability results are also obtained when no polyvalent metal ion salt is utilized in the water phase, and stannous stearate is present in the oil phase comprising 1% by weight of the oil phase. Similar composition stability results are also obtained when no polyvalent metal ion salt is utilized in the water phase, and the acid lipid employed is stannous stearate.

EXAMPLE II

The oil phase composition and preparation was identical with Example I. The total amount of oil phase used in making the emulsion as hereinafter explained was 12 grams.

The water phase comprised the following ingredients and proportions: The water-soluble heat-denaturable protein was a 1:1:1 mixture of egg white, soy protein and acid-hydrolyzed gliadin which is a wheat protein; the total amount of protein used was 36 grams (22.6% by weight of the water phase); the amount of water used was 123 grams; the water-soluble polyvalent metal ion salt was 0.123 gram (.08% by weight of the water phase) of $CaCl_2$.

The oil phase and water phase were mixed at a weight ratio of oil phase to water phase of 1:10 using the mixing conditions of Example I. Thereafter the emulsion was heat set in a microwave oven for 3 minutes at 90° C. The emulsion was dried at 365° F. Apparent interfacial tension measurements of the composition, taken as previously described, gave an interfacial tension value of about 39 dynes/centimeter.

Compositions of substantially similar stability are obtained when the stearic acid in the oil phase is replaced with the condensation product of 1-monostearin with trihydroxyglutaric acid or the condensation product of propylene glycol monostearate with tartaric acid; and the $CaCl_2$ of the water phase is replaced with aluminum sulfate or manganese succinate.

EXAMPLE III

The oil phase composition and preparation was identical with Example I. The total amount of oil phase used in making the emulsion as hereinafter described was 32 grams.

The water phase comprised the following ingredients and proportions: The water-soluble heat-denaturable protein was 32 grams (17.6% by weight of the water phase) of a 1:1 mixture of soy protein and lactalbumin; the amount of water used was 150 ml., and the water-soluble polyvalent metal ion salt was 0.150 gram (0.08% by weight of the water phase) of $CaCl_2$.

The oil phase and the aqueous phase were mixed at a weight ratio of oil phase to water phase of 1:6.8 using the conditions of Example I. The emulsion was heat set in a boiling water bath for 45 minutes and dried by 365° F. hot air. Apparent interfacial tension measurements of the emulsion composition gave a value of 29 dynes/centimeter.

Compositions of substantially similar stability are obtained when the stearic acid in the oil phase is replaced with the condensation product of petroselaidic acid with citric acid or the condensation product of behenic acid with malic acid and the $CaCl_2$ of the water phase is replaced with stannous chloride or nickel nitrate.

EXAMPLE IV

The oil phase comprised 50 grams of a mixture of soybean oil hydrogenated to an I.V. of 107 and stearic acid. The amount of stearic acid was 1.0 gram (2% by weight of the oil phase). The preparation of the oil phase was identical with Example I.

The water phase comprised the following ingredients and proportions: the water-soluble heat-denaturable protein was 30 grams (23.1% by weight of aqueous phase) of a mixture of 1:1 soy protein and lactalbumin; the amount of water used was 100 ml.; the amount of water-soluble polyvalent metal ion salt ($CaCl_2$) was 0.100 gram which is .08% by weight of the water phase.

The oil phase and the aqueous phase were mixed at a weight ratio of oil phase to water phase of 1:3 using the conditions of Example I. The emulsion was placed in a microwave oven and dried completely. The dried emulsion was ground with a mortar and pestle to yield a spread of the consistency of peanut butter. Du Nouy tensiometer measurements of the apparent interfacial tension of the emulsion composition gave a value of 29 dynes/centimeter. Substantially similar stability results are obtained when elaidic acid is employed in the oil phase instead of stearic acid.

Compositions of substantially similar stability are also obtained when the stearic acid of the oil phase is replaced with the condensation product of myristyl alcohol with diglycolic acid at the $CaCl_2$ of the water phase is replaced with magnesium iodide.

EXAMPLE V

The oil phase comprised 17 grams of a mixture of deodorized lard and octadecyl hydrogen succinate. The octadecyl hydrogen succinate acidic lipid comprised 2% by weight of the oil phase. The oil phase preparation was as described in Example I.

The aqueous phase comprised the following: 36 grams (30.7% by weight of the water phase) of soybean protein; 80 ml. of water; and 1.0 gram (.9% by weight) of $CaCl_2$.

The oil phase and the aqueous phase were mixed at a weight ratio of oil phase to water phase of 1:3 using the conditions of Example I. The emulsion was heated in a microwave oven for 4 minutes and then dried with 375° F. air for 5 minutes. Du Nouy tensiometer measurements of the apparent interfacial tension of the emulsion composition of this example gave a value of about 30 dynes/centimeter.

Compositions of substantially similar stability are obtained when the octadecyl hydrogen succinate of the oil phase is replaced by stearyl gallate or elaidyl gallate, and the $CaCl_2$ of the water phase is replaced by cobalt chloride.

EXAMPLE VI

The oil phase comprised .5 gram of stearoyl chloride in 24.5 grams of purified cottonseed oil. The stearoyl chloride comprised 2% by weight of the oil phase. The preparation of the oil phase was identical with that described in Example I.

The water phase comprised the following ingredients and proportions: the water-soluble heat-denaturable protein was 1.25 grams (5% by weight) of fresh egg white; 10 grams of sucrose; and 13.75 grams (55% by weight) of water.

Because stearoyl chloride was utilized as the acidic lipid of the oil phase, no water-soluble polyvalent metal ion salt was employed.

The oil phase and the aqueous phase were mixed at a weight ratio of oil phase to aqueous phase of 1:1 utilizing the conditions of Example I. Du Nouy tensiometer measurements of the apparent interfacial tension of the emulsion composition gave a value of 28 dynes/centimeter.

When the stearoyl chloride of the oil phase replaced with oleoyl chloride or elaidoyl chloride, compositions of substantially similar stability are formed.

Food products containing the emulsions of Examples II through V

EXAMPLE VII

A high protein confection snack was prepared using an emulsion identical with that prepared in Example II as the source of protein and fat. The product had the following composition:

| | |
|---|---|
| Egg white solids grams__ | 12 |
| Soy protein do____ | 12 |
| Acid-hydrolyzed gliadin (neutralized with sodium hydroxide to pH 7) do____ | 12 |
| Sucrose do____ | 10 |
| Sugar substitute do____ | 1 |
| Wheat starch do____ | 5 |
| Salt do____ | .5 |
| Oil phase as described in Example II _____ do____ | 12 |
| Water ml__ | 123 |
| CaCl$_2$ grams__ | 123 |

Flavoring and minors (25 drops caramel, 7 drops raisin, and 5 drops orange flavoring).

The procedure of mixing the ingredients comprised mixing the acid-hydrolyzed gliadin in about 80 ml. of water and neutralizing to a pH of 7 with sodium hydroxide. Thereafter the remaining ingredients were added and mixed in an Osterizer blender for 1 minute at high speed. The mixture was poured in a thin layer into a Corning Ware dish and dried in a microwave oven for about 1 minute at high and 2 minutes on low, as indicated by the microwave energy gauge. The product at this point became hard and was cut into squares and browned in a conventional hot air oven. The product expanded and was very crisp. Subsequent analysis of the product revealed it comprised 53% protein, 25% carbohydrate, 19% fat, and 3% minors.

EXAMPLE VIII

A high protein cereal-type product was prepared utilizing an emulsion identical with that prepared in Example III above. The high protein cereal product comprised the following ingredients:

| | |
|---|---|
| Oil phase (2% stearic acid in safflower seed oil having an SCI value of 28 at 70° F.) grams__ | 32 |
| Soy protein do____ | 16 |
| Lactalbumin do____ | 16 |
| Corn flour do____ | 16 |
| Wheat starch do____ | 17 |
| Salt do____ | 3 |
| Water ml__ | 150 |
| Calcium chloride gram__ | 0.150 |

The lactalbumin and the soy protein and the water which contained the calcium chloride were mixed on a magnetic stirrer and adjusted to a pH of 7 with 10% sodium hydroxide. Thereafter the oil phase was added and mixing was conducted for 1 minute on an Omnimixer. The remaining ingredients were combined and beaten in by hand and thereafter mixed for 1½ minutes on an Omnimixer. Subsequently the mixture was poured into a large dialysis tubing and heat-set in a boiling water bath for 45 minutes. It was cooled to room temperature (about 20 minutes), removed from the dialysis casing, wrapped in a preservative plastic wrapping, and refrigerated overnight and thereafter sliced and dried in a hot air oven at 375° F. to provide a cereal-like product. If desired, the product after removal from refrigeration can be sliced and fried to provide a chip-type product. The composition of the high protein food was found to be 32% protein, 33% carbohydrate, 32% fat, and 3% minors.

EXAMPLE IX

A high protein spread having an emulsion composition identical with that of Example IV was prepared and had the following ingredients:

| | |
|---|---|
| Oil phase (2% stearic acid in soybean oil hydrogenated to an IV of 107) grams__ | 50 |
| Soy protein do____ | 15 |
| Lactalbumin do____ | 15 |
| Wheat starch do____ | 10 |
| Corn flour do____ | 10 |
| Salt do____ | 1 |
| Calcium chloride do____ | .1 |
| Water ml__ | 100 |

The ingredients were mixed and heat-set exactly as previously described with reference to Example VIII. The refrigerated dough was sliced into ¼-inch thick slices and dried in a microwave oven for 4½ minutes on low; thereafter it was ground in a mortar and pestle to yield a spread-like product having the consistency of peanut butter. Additional flavoring to produce a spread having the specific flavor one desires can be added.

EXAMPLE X

A toasted cereal-like product was prepared utilizing the emulsion described in Example V. The cereal had the following composition:

| | |
|---|---|
| Water ml__ | 80 |
| Soy protein grams__ | 36 |
| Wheat starch do____ | 5 |
| Amylopectin do____ | 2 |
| Calcium chloride do____ | 1 |
| Dry vanilla do____ | 1 |
| Cinnamon-sugar flavor do____ | 5 |
| Oil phase (2% octadecyl hydrogen succinate in deodorized lard) grams__ | 17 |

All the dry ingredients were blended together and melted; thereafter the oil and aqueous phases were added to the dry ingredients simultaneously and mixed for 1 minute in an Omnimixer. The emulsion which formed was placed in a pan and heat-set and partially dried in a microwave oven for 4 minutes. The sample was sliced into 1-inch squares which were about ⅛" thick and completely dried in a hot air oven at 375° F. for 5 minutes. The final product closely resembled a toasted cereal or other snack-type food product and had the following composition:

| | Percent |
|---|---|
| Protein | 44 |
| Fat | 25 |
| Carbohydrate | 31 |

What is claimed is:

1. A process of forming a stable emulsion from liquid fat, particular acidic lipids, water, water-soluble heat-denaturable protein and a polyvalent metal ion, said emulsion being a useful additive in preparing food products, said process comprising:
    (1) forming an oil phase consisting essentially of:
        (a) a liquid fat;
        (b) up to 4% by weight of the oil phase of an oil-soluble polyvalent metal ion salt; and
        (c) an acidic lipid selected from the group consisting of:
            (i) saturated and trans unsaturated fatty acids containing from 12 to 22 carbon atoms or oil-soluble salts thereof;
            (ii) the condensation product of either a fatty acid monoglyceride, a fatty acid diglyceride, a mixture of partial fatty acid glycerides or a monoester of a straight chain aliphatic diol with a saturated or trans unsaturated fatty acid having from 12 to 22 carbon atoms, with a polycarboxylic acid which has from 0 to 4 hydroxyl groups, said condensation product having at least one free carboxyl group per molecule;
(iii) the condensation product of a saturated or trans unsaturated fatty acid containing from 12 to 22 carbon atoms with a polycarboxylic acid having from 1 to 4 hydroxyl groups, said condensation product having at least one free carboxyl group per molecule;
(iv) the condensation product of a saturated or trans unsaturated straight chain fatty alcohol containing from 12 to 22 carbon atoms with a dicarboxylic acid having no hydroxyl groups and containing from 3 to 6 carbon atoms, said condensation product having at least one free carboxyl moiety per molecule;
(v) fatty alkyl or trans fatty alkenyl gallates having a chain length of from 12 to 22 carbon atoms;
said acidic lipid comprising from 0.1% to 10% by weight of the oil phase; and
(2) forming a water phase comprising water and water-soluble, heat-denaturable protein, said protein comprising from about 1.0% to 50% by weight of the water phase and up to about 6% of a water-soluble polyvalent metal ion salt;
(3) mixing at a weight ratio of oil phase to water phase of 4:1 to 1:10, the oil phase and the water phase to provide an emulsion, said emulsion containing from about 0.002% to 5.4% by weight of polyvalent metal ion salt; and
(4) heating said emulsion at a temperature in excess of 40° C. for a sufficient period of time to heat set said emulsion.

2. The process of claim 1 wherein the acidic lipid is selected from the group consisting of saturated and trans unsaturated fatty acids containing from 12 to 22 carbon atoms, and alkyl and trans fatty alkenyl gallates wherein the alkyl or trans fatty alkenyl group contains from 12 to 22 carbon atoms.

3. The process of claim 2 wherein the saturated and trans unsaturated fatty acids contain from 13 to 18 carbon atoms, and the alkyl or trans fatty alkenyl group of the alkyl or trans fatty alkenyl gallate contains from 14 to 18 carbon atoms.

4. The process of claim 3 wherein the acidic lipid comprises from 0.5% to 6.0% by weight of the oil phase.

5. The process of claim 1 wherein the protein comprises from 2.5% to 40% by weight of the water phase.

6. The process of claim 1 wherein the polyvalent metal ion is provided by a water-soluble polyvalent metal ion salt comprising from .1% to 2% by weight of the water phase.

7. The process of claim 6 wherein the polyvalent metal ion is calcium.

8. The process of claim 1 wherein the polyvalent metal ion is provided by an oil-soluble polyvalent metal ion salt comprising from about 0.25% to 2% by weight of the oil phase.

9. The process of claim 1 wherein the weight ratio of oil phase to water phase is from 3:1 to 1:3.

10. The process of claim 9 wherein mixing is continued for from 1 minute to 15 minutes.

11. The process of claim 1 wherein heating is conducted at a temperature in excess of 60° C.

12. The process of claim 11 wherein heating is conducted for from 5 minutes to 45 minutes.

13. The process of claim 1 wherein an additional step subsequent to the heating step comprises adding from 1% to 35% by weight to the emulsion of a carbohydrate material to said emulsion.

14. The process of claim 13 wherein the amount of carbohydrate material is from 5% to 20% by weight of the emulsion.

15. The product of the process of claim 1.

16. A process of forming a stable emulsion from liquid fat, a particular acidic lipid, water and a water-soluble, heat-denaturable protein, said emulsion being a useful additive in preparing food products, said process comprising:
(1) forming an oil phase comprising:
  (a) a liquid fat; and
  (b) a fatty acid chloride containing from 12 to 22 carbon atoms;
said fatty acid chloride comprising from 0.1% to 10% by weight of the oil phase;
(2) forming a water phase comprising water and water-soluble, heat-denaturable protein, said protein comprising from about 1.0% to 50% by weight of the water phase;
(3) mixing at a weight ratio of oil phase to water phase of 4:1 to 1:10, the oil phase and the water phase to provide an emulsion; and
(4) heating said emulsion at a temperature in excess of 40° C. for a sufficient period of time to heat set said emulsion.

17. The process of claim 16 wherein the fatty acid chloride contains from 13 to 18 carbon atoms.

18. The process of claim 17 wherein the acidic lipid comprises from 0.5% to 6.0% by weight of the oil phase.

19. The process of claim 16 wherein the protein comprises from 2.5% to 40% by weight of the water phase.

20. The process of claim 16 wherein the weight ratio of oil phase to water phase is from 3:1 to 1:3.

21. The process of claim 20 wherein mixing is continued for from 1 minute to 15 minutes.

22. The process of claim 16 wherein heating is conducted at a temperature in excess of 60° C.

23. The process of claim 22 wherein heating is conducted for from 5 minutes to 45 minutes.

24. The process of claim 16 wherein an additional step subsequent to the heating step comprises adding from 1% to 35% by weight of the emulsion of a carbohydrate material to said emulsion.

25. The process of claim 24 wherein the amount of carbohydrate material is from 5% to 20% by weight of the emulsion.

26. The product of the process of claim 16.

References Cited
UNITED STATES PATENTS

| | | | |
|---|---|---|---|
| 3,168,405 | 2/1965 | Martin et al. | 99—91 |
| 2,913,342 | 11/1959 | Cameron et al. | 99—123 |
| 2,954,297 | 9/1960 | Elsesser et al. | 99—94 |
| 3,108,873 | 10/1963 | Durst | 99—14 |

ALVIN E. TANENHOLTZ, Primary Examiner

T. G. WISEMAN, Assistant Examiner

U.S. Cl. X.R.

99—14, 17, 18, 19, 83